3,052,650
HEAT-CURING EPOXY RESIN COMPOSITIONS
Robert L. Wear, West St. Paul, and Robert L. Bowman, White Bear Lake, Minn., assignors to Minnesota Mining and Manufacturing Company, St. Paul, Minn., a corporation of Delaware
No Drawing. Filed Feb. 9, 1959, Ser. No. 791,795
5 Claims. (Cl. 260—47)

This application is a continuation-in-part of copending application S.N. 345,245, filed March 27, 1953, now abandoned.

This invention relates to epoxy resin compositions, and especially to normally liquid compositions, which are relatively inactive at normal room temperatures but are converted to hard, tough solids by brief heating at moderate temperatures. The liquid compositions of this invention remain free-flowing for desirably long periods at normal room temperatures and are particularly useful as impregnating and embedding compounds for electrical coils and other electrical components. Their viscosity is such that they penetrate between the windings of the coil to provide complete impregnation, and when then heated they form hard, tough, firmly adherently-bonded resinous components having excellent insulating and protective properties.

One of the objects of the invention is to provide a self-curing epoxy resin composition which may be held at normal room temperatures for many hours or days without curing, after which period the composition is still a free-flowing liquid or upon warming becomes a free-flowing liquid which will then cure rapidly when heated to moderate temperatures of the order of 250° F. A particular object is to provide a liquid epoxy resin composition which has a pot life at a viscosity of less than 50 poises at normal room temperatures of at least 12 hours and may then be cured to a hard and tough state simply by heating for not more than one or two hours at 250° F. Ancillary objects include the provision of epoxy resin curing agents which are relatively inactive at normal room temperatures but become highly active at elevated temperatures; the method of compounding and curing epoxy resins, particularly the normally liquid epoxy resins, which involves the utilization of such curing agents; and the improved products and structures therewith obtained. Still other objects and advantages will be pointed out, or will become apparent, in the ensuing description.

The epoxy resins constitute a known class of resinous materials containing the 1,2-epoxy

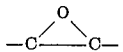

linkage. The term "epoxy resin" as herein used has particular reference to those epoxy ethers produced by interreaction of epichlorhydrin and polyhydroxy compounds, or more particularly with polyhydroxy phenols, and thus refers to polyglycidyl ethers of polyhydric phenols.

The epoxy resins are not self-hardening and so must be admixed with a chemical hardening agent. A well known class of hardening agents for epoxy resin is the polycarboxylic acid anhydrides. While these are reasonably effective for curing most solid epoxy resins, they are ineffectual for most liquid epoxy resins. The reasons for this difference in reactivity was not understood prior to this invention, and in the event that the anhydride did not cure a particular epoxy resin within a reasonable time, the anhydride was replaced by some other hardening agent, such as diethylenetriamine or triethylamine or other alkaline catalyst, usually at the expense of pot life or quality of cured product. For example, in large-scale operations it is desirable to mix at one time sufficient material for at least several hours of operation and to refill containers with newly mixed batches without first removing unused material left from previous batches. Unless present in such small proportion that they are ineffective in curing epoxy resin, the alkaline catalysts are much too active to permit such operations.

The present invention provides epoxy resin compositions which are stable for at least 12 hours at room temperature but are still capable of rapid and complete cure at moderately elevated temperatures of the order of 250° F., and which in the preferred form are liquids which remain below 50 poises in viscosity for at least 12 hours at normal room temperatures. In short, the novel compositions consist essentially of a mixture of (1) an epoxy resin (i.e., a polyglycidyl ether of a polyhydric phenol) having more than one 1,2-epoxy group per average molecular weight and having more 1,2-epoxy groups than hydroxyl groups, (2) a polycarboxylic acid anhydride in an amount sufficient to provide about 0.5–2 anhydride groups per 1,2-epoxy group, which amount of anhydride dissolves in a liquid polyglycidyl ether of a polyhydric phenol to produce compositions which remain liquid at room temperature, and (3) a soluble tertiary amine catalyst which has no more than one phenyl group bonded to the amino nitrogen and has a basicity greater than that of triphenylamine and is present in an amount sufficient to reduce the cure time of the catalyzed composition at 250° F. to not more than about one-fifth the cure time of the uncatalyzed mixture of resin and anhydride, while providing a homogeneous dense cured product.

If the epoxy resin has more hydroxyl groups than 1,2-epoxy groups, as is the case with most solid epoxy resins, the hydroxyl groups are apparently reasonably effective in initiating the epoxy-anhydride reaction so that less need exists for the basic tertiary amine catalyst.

If the polycarboxylic acid anhydride is dibasic, about 0.5–2 mols of anhydride per equivalent of epoxide is required for best results in terms of complete cure. However, only about 0.25–1 mol of a dianhydride such as pyromellitic dianhydride should be used.

The basic tertiary amine catalyst is preferably present in an amount such that the mixture cures completely within 1–2 hours at 250° F. Normally about 1–2 parts catalyst per 100 parts resin is sufficient although as much as about 5 parts may be used to further speed the cure, with due regard in employing amounts much greater than 1–2 parts to danger of bubbling, charring or undue shortening of the pot life. Because the curing reaction takes place primarily by cross-linking between the epoxy resin and the anhydride, the tertiary amine apparently acts only as an activator or catalyst for the reaction and hence is highly effective even though present in extremely small proportions. As little as 0.01 part by weight of tertiary amine for each 100 parts of epoxy resin usually reduces the cure time to less than one-fifth that of an uncatalyzed mixture of anhydride and an epoxy resin which has fewer hydroxyl groups than 1,2-epoxy groups. At least sufficient basic tertiary amine should be present to substantially completely cure the composition in about 4 hours at 250° F.

Normally the novel composition is marketed in two containers, one containing epoxy resin and the other containing admixed anhydride and basic tertiary amine catalyst, in which case the anhydride and amine must not interact in storage to form an insoluble product to prevent the amine from effectively catalyzing the epoxy-anhydride reaction. The contents of at least one of the containers is preferably pigmented to assist the ultimate consumer in determining when mixing is complete.

The self-curing mixture obtained by combining the contents of the two containers should be stable for at least 12 hours at room temperature to allow at least a full working day before a fresh mixture must be prepared. Preferably, the mixture is initially a thin liquid and remains below 50 poises in viscosity for more than a working day. However, if the mixture is initially a thick liquid, a powder or mixed liquid and solid, it may be warmed during such period to a viscosity of below 50 poises and remains at such reduced viscosity for a period of time more than adequate to apply it to an intended use. It has been found in practice that mixtures having a viscosity of less than about 50 poises are applicable in impregnating electrical coils and the like.

The invention will now be further described and illustrated in terms of specific examples, in the first of which is employed a typical liquid epoxy resin formerly marketed commercially as "Bakelite Resin BR–18774," which resin is presently designated "ERL–2774." This resin is a polyglycidyl ether of a polyhydric phenol prepared from epichlorhydrin and bisphenol and has a Durrans' melting point of about 10° C., an epoxy value of about 0.52 epoxide equivalent per 100 grams, and a hydroxyl value of about 0.08 hydroxyl equivalent per 100 grams, and so contains about 6.5 epoxy groups for each hydroxyl group.

Example I

A mixture of 100 parts by weight of liquid epoxy resin ("Bakelite BR–18774"), 150 parts of tetrapropenyl succinic anhydride, and 1.5 parts of dimethylbenzylamine was prepared. Initial viscosity at normal room temperature was 7 poises, the viscosity slowly increasing to 50 poises at 72 hours. The liquid mixture cured to a hard, strong, tough solid when heated at 250° F. for 1–2 hours.

The tetrapropenyl succinic anhydride was prepared by heating together equimolar proportions of maleic anhydride and the tetramer of propylene. Mixtures of this liquid polycarboxylic acid anhydride with the liquid epoxy resin in the absence of the tertiary amine catalyst do not even gel within 30 hours at 250° F.

In these compositions, the ratio of epoxide equivalents to mols of anhydride was 1:1. In other words, these compositions contained one anhydride group per 1,2-epoxy group.

A mixture of 100 parts of the liquid epoxy resin with 68 parts of octenyl succinic anhydride and 0.5 part dimethylbenzylamine required 35–40 hours at room temperature to reach a viscosity of 50 poises, and cured in 1–2 hours at 250° F. The ratio of epoxide equivalents to mols of anhydride was 1:0.65. About the same degree of room-temperature stability was obtained when the proportion of octenyl succinic anhydride was increased to 126 parts, i.e. to a ratio of 1 epoxide equivalent to 1.2 mols of anhydride, and the amount of dimethylbenzylamine was increased to 1 part. Again the cure time was 1–2 hours at 250° F.

In these compositions, substantially complete cure is considered to be the point at which no further significant hardening or similar evidences of further cross-linking occur on continued heating at the curing temperature. It will be appreciated that some additional cross-linking or curing of the resin may, and probably does, occur during such continued heating, and to an even greater extent when the additional heating is carried out at still higher temperatures. For example, some evidence of increased toughness after heating at higher temperatures has been noted. However the measurable physical properties of the substantially completely cured resin in general remain substantially unchanged by such treatment.

Additional examples of liquid dicarboxylic acid anhydrides which have been found useful in curing liquid epoxy resin in admixture with basic tertiary amine catalyst are dodecenyl succinic anhydride, triisobutenyl succinic anhydride, nonenyl succinic anhydride, diisobutenyl succinic anhydride, 2-ethylbutenyl succinic anhydride, hexenyl succinic anhydride, pentenyl succinic anhydride, butenyl succinic anhydride and propenyl succinic anhydride. Citraconic anhydride and chloromaleic anhydride show a tendency to decompose and cause bubbling when the mixture is heated too rapidly but may be used under less drastic conditions. Other liquid alkyl, alkenyl, cycloalkyl, and alkylene substituted anhydrides are applicable.

Mixtures of each of the above-named anhydrides with the liquid epoxy resin and catalytic quantities of basic tertiary amine likewise have low room-temperature viscosity, requiring upwards of two days to reach 50 poises. Nevertheless, the mixtures cure rapidly and completely when held at moderately elevated temperatures of the order of 250° F., curing being accomplished in most cases in 1–2 hours.

Example II

A mixture of 100 parts by weight of the liquid epoxy resin of Example I, 150 parts of tetrapropenyl succinic anhydride and 0.75 part of tris(2,4,6-dimethylaminomethyl) phenol was warmed to 125° F. and placed in a vacuum chamber. A vacuum was pulled until foam on the surface collapsed at about 25 mm. pressure. The resin was removed from the vacuum and poured into a heated mold containing a small magneto coil consisting of a very large number of turns of #42 enameled copper wire (0.0027-inch diameter including insulation). The mold had previously been coated with a silicone release agent and heated together with the coil in an oven at 250° F. for 45 minutes. The filled mold was placed in the vacuum chamber, and the pressure was reduced until foam on the surface collapsed. The vacuum was released and immediately reapplied to insure saturation. The resin actually reached a temperature of about 175° F. during this step, at which temperature its viscosity was less than 0.5 poise as compared to about 6.5 poises at room temperature, and was sufficiently thin to saturate every interstice of the coil, in spite of the fineness of wire. The mold was then placed in an oven at 250° F. for 1.5 hours, at which time the mold was removed and the encapsulated coil returned to the oven for another 1.5 hours to assure complete cure.

The cured resin of this example had a dielectric constant of 2.8 and a dissipation factor of 0.006, measured at 23° C. and 1 kilocycle. These excellent values for insulating resin are indicative of the widespread acceptance of the resin compositions of this invention by the electrical industry for the impregnation and encapsulation of electrical components such as resistors, solenoids, stators, transformers, etc.

Example III

A mixture of 100 parts by weight of an epoxy resin having a Durrans' melting point of about 27° C., 105 parts of tetrapropenyl succinic anhydride and 1 part of tris(2,4,6-dimethylaminomethyl)phenol formed a gel after being heated 16 minutes at 300° F., with the cure being substantially complete within an additional 10–20 minutes, as indicated by hardness tests. An identical mixture except having no tertiary amine required 5 hours to gel at this temperature.

The epoxy resin of this example was "Epon 834," a condensation product of bisphenol A and epichlorhydrin having an epoxy value of about 0.39 epoxide equivalent per 100 grams and a hydroxyl value of about 0.23 hydroxyl equivalent per 100 grams. In spite of the much lower proportion of epoxy groups to hydroxyl groups as compared to the epoxy resin of Example I (less than 2:1), the rate of cure was very substantially improved by the basic tertiary amine catalyst.

The mixtures of liquid epoxy resin, liquid polycarboxylic acid anhydride, and basic tertiary amine catalyst are easy to combine into uniform, homogeneous mixtures, since the liquids mix together readily by simple stirring at room temperatures. The mixtures are sufficiently thin for use as impregnants or saturants at ambient temperatures. Continued stirring is not required to keep the mixtures homogeneous. Hence, such combinations are preferred for most applications, but many of the advantages of such mixtures are also obtained in mixtures wherein either the epoxy resin or the anhydride or both may be normally solid.

Maleic anhydride and hexahydrophthalic anhydride, for example, are solids which dissolve readily in the liquid epoxy resin of Example I at 125° F. to produce compositions, which remain liquid for long periods when cooled to room temperature and in the presence of a basic tertiary amine activator and yet are rapidly reactive at 250° F. Anhydrides such as diglycolic, phthalic and tetrahydrophthalic anhydrides are less soluble, and the mixture cannot be used as an impregnant at room temperatures but becomes homogeneous and temporarily liquid on heating and stirring and is useful for many applications. Succinic anhydride, tetrachlorophthalic anhydride and glutaric anhydride are additional examples of suitable materials falling in this general category, application of which is indicated in the following example.

*Example IV*

A suitably stable liquid mixture of 100 parts of the liquid epoxy resin of Example I and 43 parts of maleic anhydride was formed by stirring the two components together at about 125° F. and cooling to room temperature. A blend of this mixture with 1 part of triethylamine had an initial viscosity of 1.6 poises, increasing to 3 poises in 1 hour and to 50 poises in 52 hours when held at normal room temperatures. When the liquid mixture was held at 250° F., it cured to a hard, very strong solid in one to 1½ hours.

With 0.1 part of triethylamine, the cure time at 250° F. was increased to 2–3 hours.

With 0.01 part of tirethylamine, about 6–8 hours at 250° F. was required to bring about a complete cure.

The proportion of maleic anhydride was also varied. At 43 parts of the anhydride to 100 parts of the liquid epoxy resin, the ratio of epoxide equivalents to mols of anhydride is 1:0.84. Increasing the amount of the anyhydride to 100 parts provides a ratio of 1:1.95. At this proportion some of the anhydride does not dissolve in the mixture at 50° C., but at the curing temperature, solution is complete and the mixture in the presence of the triethylamine or equivalent catalyst cures rapidly to a homogeneous, hard and tough resinous state. Reducing the amount of the anhydride to 25 parts, i.e. to a ratio of 1:0.49, increases the initial viscosity of the liquid mixture to 5 poises, but the pot life at room temperature and the curing time at 250° F. are substantially unaffected.

The surprising synergistic effect of the combination of anhydride and basic tertiary amine catalyst in effecting rapid cure of the resin while maintaining adequate room-temperature stability is demonstrated by results obtained with the anhydride and amine employed separately. A mixture of 100 parts of the liquid epoxy resin and 43 parts of maleic anhydride cured after 20 hours at 250° F. to a soft and weak solid mass, which was not improved by continuing the heating to a total of 48 hours. A mixture of 100 parts of the liquid epoxy resin and one part of triethylamine had an initial viscosity of 50 poises, increasing to 82 poises in one hour. At 250° F., this mixture required more than thirty hours for complete cure. Increasing the amount of triethylamine to 5 parts reduced the initial viscosity to 20 poises, which increased to 35 poises in one hour and to 50 poises in 2½ hours. When heated at 250° F., the mixture cured in 3–4 hours.

Often, higher heat distortion values are attained when solid anhydrides are employed instead of the liquid anhydrides of Example I. For example, the cured product of one equivalent of the epoxy resin of Example I, one mol of maleic anhydride and one part dimethylbenzylamine per 100 parts resin broke in the following heat-resistance test at 185° C. as compared to about 110° C. for comparable products obtained using liquid alkenyl succinic anhydrides instead of maleic anhydride. The test consisted of heating a ½ x ½ x 5 inch cured specimen to the test temperature for 30 minutes in an oven, removing the specimen and immediately suspending a 2350 gram weight from the center of the specimen while supporting it at its extremities. The test is repeated at various temperatures to determine the temperature of break.

A different semi-liquid epoxy resin cured at 250° F. for 2 hours with one mol of maleic anhydride per epoxide equivalent and 1 part dimethylbenzylamine per 100 parts resin produced a value of 205° C. in this heat-resistance test. This epoxy resin, which is the reaction product of a phenol-aldehyde novolak and epichlorhydrin and is almost free from hydroxyl groups, is not cured by polycarboxylic acid anhydride in the absence of basic tertiary amine within acceptable time and temperature limits. Other castings of the same composition were tested at one kilocycle, exhibiting a dielectric constant of 3.8 at 23° C. and 4.9 at 105° C. and a dissipation factor of 0.006, at each of these temperatures.

The novel compositions of this invention which either are not liquid at room temperature or are somewhat higher in viscosity than is desired may sometimes be improved for certain purposes by means of a non-volatile diluent, as illustrated in the following example.

*Example V*

A mixture of 100 parts by weight of liquid epoxy resin ("Bakelite BR–18774"), 40 parts of chlorinated biphenyl as an inert diluent, and 43 parts of maleic anhydride was found to remain below 50 poises in viscosity for two days when activated with one part of dimethylbenzylamine. The activated mixture cured in one hour at 250° F.

When the same mixture was activated with 5 parts of dimethylbenzylamine, the time within which it reached a viscosity of 50 poises at room temperature was reduced to 8 hours. Curing time at 250° F. was reduced to one-half hour.

Replacing the dimethylbenzylamine of the above formulas with one part of pyridine caused an increase in viscosity to 50 poises in 8 hours, with one hour being required for complete cure at 250° F. With five parts of pyridine, the 50 poises viscosity was reached in one-half hour at room temperature, and at 250° F. the cure was so rapid as to cause severe temperature increase and bubbling of the casting. One-tenth part of pyridine produced a mixture which remained below 50 poises viscosity for somewhat more than 24 hours, and which cured completely when heated for 2–4 hours at 250° F. or more rapidly at higher temperatures. At 0.01 part of pyridine, substantially complete cure could be obtained in about 4–8 hours at 250° F.

Although compositions which are thin liquids at room temperatures or at slightly elevated temperatures are much preferred for applications involving impregnation, embedding or the like, high melting epoxy resins may be preferred for diverse uses. For example, a commercially-available high-melting epoxy resin, the cured products of which have particularly high heat distortion values, is "Epon 1310" which is understood to be the condensation product of 1,1,2,2-tetrakis(4-hydroxyphenyl)ethane and epichlorhydrin having an average of about three glycidyl ether groups in the molecule. The substituted ethane is believed to be derived from glyoxal and phenol, and some of its phenyl groups may be substituted at the ortho rather than para position with respect to the ethane. This resin has a Durrans' melting point of about 80° C., an epoxy value of about 0.45 epoxide equivalent per 100 grams, and a hydroxyl value of about 0.12 hydroxyl equivalent per 100 grams, and so contains about 4 epoxy groups for each hydroxyl group.

*Example VI*

To 22.6 grams of melted "Epon 1310" were added 23.4 grams of the adduct prepared by reacting myrcene in equal molar proportion with maleic anhydride by the Diels-Alder process. The mixture contained about one epoxide equivalent per mol of anhydride. To a portion of this mixture was added 1.7 parts of tris(2,4,6-dimethylaminomethyl)phenol per 100 parts epoxy resin. This and another portion containing no tertiary amine were placed in an oven at 250° F. The portion containing tertiary amine gelled to a hard, firm state in 10 minutes whereas the other portion formed a soft gel after 240 minutes.

Basic tertiary amines are generally superior to other alkaline materials as the activating agents for mixtures of epoxy resin and polycarboxylic acid anhydride. Inorganic materials such as the alkali hydroxides, and primary or secondary amines, i.e. non-tertiary amines, often cause formation and settling out of insoluble residues to result in products which are non-homogeneous and have inferior electrical properties. Tertiary amines, such as triphenylamine, having more than one phenyl or analogous group bonded to the amino nitrogen, do not activate the epoxide-anhydride reaction. As typical examples of tertiary amine activators having a basicity greater than that of triphenylamine and which are suitable for the purposes of the present invention may be mentioned triethylamine, tripropylamine, dimethylbenzylamine, pyridine, dimethylcyclohexylamine, methyl piperidine, dimethylbutylamine, dimethylaniline, quinoline, the picolines, dimethyl hexylamine.

These and other tertiary amine activators may also be employed in the form of salts. In this form the compounds are found to be less active at normal room temperatures while still having substantially the same activity at elevated temperatures of the order of 250° F.

*Example VII*

A liquid mixture consisting of 12 parts by weight of tetrapropenyl succinic anhydride, 8 parts of liquid epoxy resin ("Bakelite BR-18774") and 0.17 part of the oxalic acid salt of triethylamine was prepared. This mixture underwent a very slow increase in viscosity at room temperature, requiring about 10 days to reach a value of 50 poises. It cured in 1-2 hours at 250° F. to a substantially fully cured, hard and tough resinous product.

Other analogous activator materials containing the basic tertiary amino grouping and which may be considered fully equivalent to the basic tertiary amines for the purposes of this invention include the benzoic acid salt of triethylamine, tetramethylammonium acetate, triethylamine hydrochloride, the maleic acid salt of N-methyl morpholine, the nitrobenzoic acid salt of triethylamine, tetramethylammonium acetate, trimethylbenzyl ammonium acetate and the like.

*Example VIII*

A solution of 27 parts polyacrylic acid and 100 parts of 3-diethylaminopropyl phthalimide in 217 parts of water was stirred rapidly for an hour until smooth. The resultant tertiary amine salt solution had a viscosity of 49 poises. Sixty grams of liquid epoxy resin (essentially identical to that of Example I) were mulled with 3000 grams of washed, rounded silica sand averaging 100 mesh for about 5 minutes, after which 90 grams of the above solution were added, with mulling continued an additional 5 minutes. The sand mix thus produced, which was stable for at least 24 hours, was blown into a mold containing a 2.5-inch bus bar which protruded from each end of the mold. The mold cavity, which was 1.5 inches in diameter, had first been dusted with a foundry-sand release powder.

After baking 30 minutes at 250° F., the mold was removed, and the baked shape was lowered to a depth of ½ inch into a bath containing 2 parts by weight of the epoxy resin of Example I and 3 parts tetrapropenyl succinic anhydride. The baked shape was completely saturated with the resin composition by capillary action after 3 to 4 minutes in the bath. After an additional two hours in the oven, the impregnated shape was cured completely to a hard, tough, resinous shape consisting of 82% sand and 18% cured resin by weight. While curing of the resin composition had been effectively catalyzed by the basic tertiary amine salt, resin remaining in the bath was still thinly liquid and suitable for reuse in impregnating additional baked shapes.

The encapsulated bus bar of this example is useful as a transformer lead-in, replacing ceramic plates in such use. As compared to cured resinous products containing no sand or other filler, the sand improves thermal conductivity and so assists in avoidance of overheating and provides a closer match to the thermal expansion of copper, in addition to effecting substantial decrease in material cost. The property of good electrical insulation is retained, since the cured shape when tested at 1 kilocycle had a dielectric constant of 3.8 and a dissipation factor of 0.006. The dielectric strength of a 55 mil sample was 725 volts per mil, an excellent value in view of the large percentage of sand.

The epoxy resin compositions of this invention have been modified or extended by a variety of fibrous and finely divided inert filler material such as fuller's earth, quartz flour, asbestos, glass filaments, etc., and the electrical, physical or chemical properties of cured products of the novel compositions have been modified by incorporation of plasticizers, resins, conductive materials such as carbon or metal powders, etc.

Resinous castings produced from compositions as herein described and consisting essentially of epoxy resin, polycarboxylic acid anhydride and basic tertiary amine are essentially homogeneous in structure, the curing reaction proceeding smoothly and uniformly without formation of water or other volatiles. The cured products are hard and tough, being high in mechanical strength as measured by impact tests. They have a very low coefficient of thermal expansion. They adhere firmly to surfaces of most materials with which in contact during the curing operation. They are chemically quite inert, being highly resistant to solvents, acids and other chemical reagents. Electrically, they are characterized by low power factor (low dissipation factor), low dielectric constant. The cured resins may further be identified by chemical analysis, since they give a positive test for nitrogen, e.g. when tested by sodium fusion and benzidine reaction, and have a high saponification equivalent, e.g. upwards of 100 mgms. of KOH per gram of resin, when tested under vigorous saponification procedures with strong caustic alkali.

In addition to their application as electrical impregnating and embedding compounds and the like, the compositions of this invention find utility as abrasive binders in making abrasive-coated sheet materials or other surface-coated structures as well as abrasive wheels and discs. They are also useful in making fiber-reinforced structures such as tubes, plates, beams, wheels, rods and sheets in which woven or unwoven fibers or filaments are bonded into a unitary structure of exceptionally high strength and shock resistance by means of the cured epoxy resin. Other applications will be apparent, in which the physical strength, toughness, adhesion, chemical inertness and similar properties of the resinous products, as well as the room-temperature stability, rapid heat-curing and other properties of the reactive compositions, provide unique and highly useful results.

What is claimed is:
1. A self-curing composition which is essentially free from volatile solvent and in the absence of filler can be maintained in a liquid state below 50 poises in viscosity for at least 12 hours, the curing reaction of which proceeds essentially without formation of water, said composition comprising (1) polyglycidyl ether of a polyhydric phenol having more 1,2-epoxy groups than hydroxyl groups, (2) polycarboxylic acid anhydride in an amount sufficient to provide about 0.5-2 anhydride groups per 1,2-epoxy group, which amount of anhydride dissolves in a liquid polyglycidyl ether of a polyhydric phenol to produce compositions which remain liquid at room temperature, and (3) a soluble tertiary amine catalyst having an amino nitrogen to which is bonded no more than one phenyl group, the amino nitrogen of said catalyst being exclusively tertiary amino, said catalyst having a basicity greater than that of triphenylamine and being present in catalytic amount within the range of 0.01–5.0 percent of the weight of the polyglycidyl ether and sufficient to reduce the cure time of the catalyzed composition at 250° F. to not more than about one-fifth the cure time of the uncatalyzed mixture of resin and anhydride, while providing a homogeneous, dense, hard, tough, substantially completely cured product within 4 hours at 250° F.

2. The method of making a self-curing composition which is essentially free from volatile solvent and which in the absence of filler can be maintained in a liquid state below 50 poises in viscosity for at least 12 hours, the curing reaction of which proceeds essentially without formation of water, said method comprising mixing together (1) a polyglycidyl ether of a polyhydric phenol having more 1,2-epoxy groups than hydroxyl groups, (2) polycarboxylic acid anhydride in an amount sufficient to provide about 0.5–2 anhydride groups per 1,2-epoxy group, which amount of anhydride dissolves in a liquid polyglycidyl ether of a polyhydric phenol to produce compositions which remain liquid at room temperature, and (3) a soluble tertiary amine catalyst having an amino nitrogen to which is bonded no more than one phenyl group, the amino nitrogen of said catalyst being exclusively tertiary amino, said catalyst having a basicity greater than that of triphenylamine and being present in catalytic amount within the range of 0.01–5.0 percent of the weight of the polyglycidyl ether and sufficient to reduce the cure time of the catalyzed composition at 250° F. to not more than about one-fifth the cure time of the uncatalyzed mixture of resin and anhydride, while providing a homogeneous, dense, hard, tough, substantially completely cured product within 4 hours at 250° F.

3. The method of making a self-curing composition which is essentially free from volatile solvent and in the absence of filler can be maintaned in a liquid state below 50 poises in viscosity for at least 12 hours, the curing reaction of which proceeds without formation of water, said method comprising mixing together (1) a polyglycidyl ether of a polyhydric phenol having more 1,2-epoxy groups than hydroxyl groups, and (2) a preformed stable mixture of (a) polycarboxylic acid anhydride in an amount sufficient to provide about 0.5–2 anhydride groups per 1,2-epoxy group, which amount of anhydride dissolves in a liquid polyglycidyl ether of a polyhydric phenol to produce compositions which remain liquid at room temperature, and (b) a soluble tertiary amine catalyst, the tertiary amino nitrogen of which is exclusively tertiary amino and to which is bonded no more than one phenyl group, said catalyst having a basicity greater than that of triphenylamine and being present in catalytic amount within the range of 0.01–5.0 percent of the weight of the polyglycidyl ether and sufficient to reduce the cure time of the catalyzed composition at 250° F. to not more than about one-fifth the cure time of the uncatalyzed mixture of resin and anhydride, while providing a homogeneous, dense, hard, tough, substantially completely cured product within 4 hours at 250° F.

4. A self-curing composition which is free from volatile solvent and in the absence of filler can be maintained in a liquid state below 50 poises in viscosity for at least 12 hours, the curing reaction of which proceeds without evolution of water, said composition consisting essentially of (1) a polyglycidyl ether of a polyhydric phenol having more 1,2-epoxy groups than hydroxy groups, (2) a liquid monovalent-hydrocarbon-substituted succinic anhydride in an amount sufficient to provide about 0.5–2 anhydride groups per 1,2-epoxy group, which amount of anhydride dissolves in a liquid polyglycidyl ether of a polyhydric phenol to produce compositions which remain liquid at room temperature, and (3) a soluble tertiary amine catalyst, the tertiary amino nitrogen of which is exclusively tertiary amino, said catalyst having no more than one phenyl group bonded to amino nitrogen and having a basicity greater than that of triphenylamine and being present in catalytic amount within the range of 0.01–5.0 percent of the weight of the polyglycidyl ether and sufficient to reduce the cure time of the catalyzed composition at 250° F. to not more than about one-fifth the cure time of the uncatalyzed mixture of resin and anhydride, while providing a homogeneous, dense, hard, tough, substantially completely cured product within 4 hours at 250° F.

5. A self-curing composition as defined in claim 4 and having a viscosity of less than 50 poises for at least 12 hours at normal room temperature, said polyglycidyl ether being a liquid and said substituted succinic anhydride being an alkenyl succinic anhydride.

References Cited in the file of this patent

UNITED STATES PATENTS

| | | |
|---|---|---|
| 2,294,259 | Peski et al. | Aug. 25, 1942 |
| 2,324,483 | Castan | July 20, 1943 |
| 2,506,486 | Bender | May 2, 1950 |
| 2,527,806 | Foster | Oct. 31, 1950 |
| 2,949,441 | Newey | Aug. 16, 1960 |

FOREIGN PATENTS

| | | |
|---|---|---|
| 133,819 | Australia | July 15, 1946 |
| 511,733 | Belgium | Nov. 29, 1952 |
| 518,057 | Great Britain | Feb. 15, 1940 |

OTHER REFERENCES

Presiswerk et al.: Electrical Manufacturing, July 1949, pages 79–81 and 166.

Narracott: British Plastics, October 1951, pages 341–5.

UNITED STATES PATENT OFFICE
CERTIFICATE OF CORRECTION

Patent No. 3,052,650                         September 4, 1962

Robert L. Wear et al.

It is hereby certified that error appears in the above numbered patent requiring correction and that the said Letters Patent should read as corrected below.

Column 1, line 56, for "and" read -- with --; line 64, for "reasons" read -- reason --; column 5, line 34, for "tirethylamine" read -- triethylamine --; column 9, line 54, strike out "tertiary"; column 10, line 15, for "hydroxy" read -- hydroxyl --; line 22, strike out "tertiary"; same column 10, line 54, for "Presiswerk" read -- Preiswerk --.

Signed and sealed this 17th day of December 1963.

(SEAL)
Attest:
ERNEST W. SWIDER                        EDWIN L. REYNOLDS

Attesting Officer                     Acting Commissioner of Patents